United States Patent [19]

Berstein et al.

[11] Patent Number: 4,861,204

[45] Date of Patent: Aug. 29, 1989

[54] TURN BROACHING TOOL

[75] Inventors: Garri Berstein, Erkelenz; Hans W. Obrig, Essen; Helmut Wittkopp, Erkelenz, all of Fed. Rep. of Germany

[73] Assignee: Wilhelm Hegenscheidt Gesellschaft mbH, Erkelenz, Fed. Rep. of Germany

[21] Appl. No.: 109,935

[22] Filed: Oct. 16, 1987

[30] Foreign Application Priority Data

Oct. 21, 1986 [EP] European Pat. Off. ........ 86114600.9

[51] Int. Cl.[4] .............................................. B23C 3/06
[52] U.S. Cl. .................................... 409/200; 407/12; 407/14; 407/19
[58] Field of Search ............................ 407/12, 14, 19; 409/199, 200

[56] References Cited

U.S. PATENT DOCUMENTS

| | | |
|---|---|---|
| 1,579,888 | 4/1926 | Raszl . |
| 2,407,921 | 9/1946 | DeLiso .................................. 407/12 |
| 2,468,745 | 5/1949 | Garand . |
| 4,269,551 | 5/1981 | Kralowetz ...................... 409/199 X |
| 4,768,904 | 9/1988 | Schmid ............................ 409/199 X |

FOREIGN PATENT DOCUMENTS 722705  3/1980  U.S.S.R. .................................. 407/12

OTHER PUBLICATIONS

Copy of p. 28 of "Maschinenmarkt," Wuerzburg 92 (1986)34.
Copy of article entitled "Neues Fertigungsverfahren Fuer Die Massenproduktion" by Heinlein Technology.

Primary Examiner—Eugene F. Desmond
Attorney, Agent, or Firm—W. G. Fasse; D. H. Kane, Jr.

[57] ABSTRACT

A broaching tool is provided with at least nine cutting tool edges arranged at its circumference. The cutting tool edges cover only a certain sector along the circumference of a tool disk while leaving another sector between a first and last cutting tool edge free of cutting tool edges. This feature enables moving a tool axially relative to a work piece without first moving the tool radially relative to the work piece. Further, the tool can be moved radially without damage. These movements are performed when the sector without cutting tool edges faces the work piece. This sector without cutting tool edges has an opening angle of less than 180° and it provides a spacing and free space relative to a work piece. Thus, work piece surfaces that have been machined by the cutting edges, are free of these cutting edges if and when the other sector faces the work piece.

16 Claims, 1 Drawing Sheet

TURN BROACHING TOOL

CROSS-REFERENCE TO RELATED APPLICATIONS

The present application relates to U.S. Ser. No.: 109,932, filed on Oct. 16, 1987, entitled METHOD AND APPARATUS FOR PERFORMING A ROTARY BROACHING OPERATION PARTICULARLY ON WORK PIECES OF ROTATIONAL SYMMETRY, now U.S. Pat. No. 4,799,839, issued Jan. 24, 1989; and also relates to U.S. Ser. No.: 109,934, filed on Oct. 16, 1987, entitled: MACHINE TOOL FOR BROACHING CRANKSHAFT CONNECTING ROD BEARINGS.

FIELD OF THE INVENTION

The invention relates to a turn broaching tool carrying a plurality of tool cutting edges along its circumferential contour. Such tools are used in lathe type broaching machines.

DESCRIPTION OF THE PRIOR ART

A pamphlet published by the German firm Heinlein entitled "Turn Broaching, A New Manufacturing Method For The Mass Production" describes two types of turn broaching, namely, the so-called linear turn broaching and the so-called rotational turn broaching. The present invention describes a tool for use in connection with the so-called rotational turn broaching. Thus, the term "turn broaching" as used herein refers to a rotational turn broaching.

The turn broaching involves a manufacturing method in which high metal removing rates and hence high dynamic stresses must be taken into account. For achieving such high metal removal rates, the broaching tools are equipped with cutting plates closely spaced from one another to provide the required cutting tool edges.

In connection with the so-called rotational turn broaching, the tool that was a linear tool has been converted into a rotational tool so that the individual cutting tool edges are located along a curved contour. Thus, it is possible to convert the conventional linear tool movement into a rotational tool movement. The basic features of such a rotational turn broaching tool are shown in a picture in the above mentioned pamphlet under the heading "Rotational Turn Broaching". The picture shows that the conventional rotational turn broaching tool carries only a very small number of tool cutting edges. Such tools are not suitable for practical purposes. Due to the small number of cutting edges large radial jumps between neighboring cutting edges cannot be avoided. As a result, the cutting depth becomes also too large. Additionally, the circumferential spacings between neighboring cutting edges are too large, causing idle time, so to speak, between the end of the effectiveness of a preceding cutting edge and the beginning of the effectiveness of a following cutting edge. To avoid these problems it is known to provide broaching tools which are equipped with circumferentially closely spaced cutting plates.

Known rotational turn broaching tools produce circumferential grooves having different cross-sectional profiles in shafts or shaft type work pieces such as crankshafts. During the performing of a broaching operation on such work pieces, the work piece rotates very rapidly while the tool rotates only slowly. One basic drawback of prior art broaching tools of this type is seen in that it is necessary to move the entire tool radially outwardly after the last cutting edge has completed its cutting path. Such radial displacement is necessary in order to disengage the tool from the work piece to then perform a work piece exchange. For such a work piece exchange the tool must be stopped because following the last cutting edge with a uniform spacing, the first cutting edge wants to again perform a cutting operation, whereby the work piece exchange could mar the surface that just has been machined. Such tool stopping and radial movement requires a relatively high mechanical control effort and expense for the respective machine tools. Further, these tools are very expensive so that their use is feasible only where large numbers of components are to be machined in a mass production operation.

An article in the Trade Magazine "Maschinenmarkt" (1986) pages 24–28 describes, under the title "Cutting Force Compensating", a broaching tool having three sectors, please see especially page 28, FIG. 8, for broaching crankshafts. The three tool sectors are actually three tools which are uniformly distributed around the crankshaft pin to be machined. The section of each tool free of cutting edges is more than 180°. The tool distribution is intended to reduce the bending load on the work piece. If the tool sections free of cutting edges extending over more than 180° are properly located, a work piece exchange is possible. However, due to the large size of the section free of cutting edges, substantial idling times cannot be avoided until the tools are back in a cutting position. These idling times may add up to a substantial loss in effective cutting time, which is to be avoided by the invention. Besides, this three sector prior art tool is limited to a particular work piece exchange position, or rather direction requiring a respective machine control and a respective coordination of the work piece exchange mechanism with the angular position of the tools in which work pieces may be exchanged.

OBJECTS OF THE INVENTION

In view of the foregoing it is the aim of the invention to achieve the following objects singly or in combination:

to provide a turn broaching tool which is so constructed that it will permit a simpler structure and a simpler control of the respective rotational turn broaching machine;

to provide a rotational turn broaching tool which will reduce the inefficient time period mentioned above and which can also be used economically where only small numbers of components or work pieces must undergo a turn broaching operation; and to provide a rotational broaching tool which deviates from a circular shape and which carries the cutting edges along predetermined circumferential zones in a closely spaced manner while leaving at least one other zone free of cutting edges.

SUMMARY OF THE INVENTION

The cutting tool according to the invention is characterized in that between a first cutting edge and a last cutting edge an opening angle of less than 180° is enclosed and so that a spacing and free space is provided between the first and last cutting edge in such a manner that work piece surface areas which have been machined by the cutting edges when these cutting edges face the work piece are free of cutting edges when the cutting edges face away from the work piece. Thus, the invention departs from the conventional uniform distribution of the cutting edges along a circumferential spiral curve. Instead, the invention leaves a gap along at least one circumferential zone of the tool and this gap is sufficiently large in the circumferential as well as in the radial direction so that when the gap faces the work piece during the rotation of the tool, the surfaces of the work piece which have been machined are not in contact with any cutting edges, whereby the work piece may be exchanged when the tool is in this rotational position. Thus, any damage or marring of the already machined surfaces of the work piece during the work piece exchange by the cutting edges is avoided. The invention also departs from the use of three sector type tools uniformly distributed about the work piece.

The arrangement of the cutting edges along a tool body as taught herein also has the advantage that the cutting edges cannot be damaged by the work piece during a work piece exchange. This danger of damage to the cutting edges during the work piece exchange is rather large in conventional devices because the work piece exchange devices, such as robot arms, change the work piece only in a radial movement, whereby an insufficient lateral guiding of the work pieces is provided so that damages to the cutting edges can hardly be avoided.

Where conventional tools are used to machine plane surfaces such as crankshaft webs, it is practically impossible to remove the work piece in the radial direction without simultaneously causing crosswise running scratches in the already machined planed surfaces while simultaneously damaging the cutting edge or tool plate in the process. To avoid these problems it is known to turn the last cutting edge completely out of engagement with the work piece and to then pull back the tool in a radial direction. Only after such pull back of the tool can the work piece be exchanged, again in a radial direction.

The invention avoids these problems, since, for exchanging the work piece, it is not necessary to move the tool into another radial position after the last cutting edge has passed through its working range. Rather, when the last cutting edge has passed through its working range with a tool according to the invention, the above mentioned gap now faces the work piece so that the latter may now be changed in the gap. Thus, the invention is capable of fully utilizing the ability of present day supply robots which are able to exchange a work piece in a few seconds. Thus, a tool according to the invention may be kept turning in many instances in a continuous manner even during the work piece exchange. By avoiding a radial tool withdrawal motion and possibly even a stopping of a rotational movement of the tool according to the invention, the invention also avoids expensive tool slides and possibly also the expensive controls in mechanical means for the interruption of the rotational tool movement. As a result, machines employing the present tools can be substantially simplified.

The present tool is also very suitable for use in connection with mass production of a large number of the same work pieces or for the production of a smaller series of work pieces. In both instances substantial time savings can be achieved by the avoidance of the radial tool movement and by avoiding the stopping of the tool rotation. Yet another advantage is seen in that an axial relative movement between the tool and work piece is possible when the gap faces the work piece. Thus, the present tool is easily moved into another working position relative to the same work piece or into another position for working on a work piece that has meanwhile been changed. These features make the present tool also very suitable for manufacturing even a small number of parts in an economical manner.

The invention also avoids the drawbacks of the above conventional tool having three sectors or sections uniformly distributed around a work piece because where a tool according to the invention is used a work piece can be exchanged in any direction in which a gap sector of more than 90° is facing, whereby it is no longer necessary to specifically adapt standardized supply robots to the machine tool that uses a tool according to the invention.

The present tool is also equipped with lateral cutting edges for machining plane surfaces such as crankshaft webs. These lateral cutting edges do not interfere with a work piece exchange because they are out of the work piece range when the gap faces the work piece, whereby a radial tool pull back and damage to the cutting edges is avoided even if plane surfaces are being machined in addition to the machining of bearing pin surfaces or the like.

By providing a single tool body with at least two groups of cutting edges with the respective gaps between the groups, it becomes possible to cut different profiles in a work piece by the same tool. This is advantageous where the number of work pieces of the same type is relatively small. By providing certain cutting edge types in duplicate in a group or groups it becomes possible to provide substantially the same useful life for all cutting edges because in those zones which are exposed to larger loads two or more cutting edges of the same type may be provided.

An especially simple construction of the present tool starts with a tool body to which the cutting edges are attached, for example, with the aid of cutting edge carriers which are so arranged that they leave the gap free of cutting edges. The carriers may be divided into sectors for an easy assembly of the tool from standardized tool components.

The cutting edges may easily be so arranged that each group of cutting edges cuts another shape on a work piece. However, this feature does not exclude the use of several groups each having the same type of cutting edges so that these groups may be used in alternate fashion, thereby increasing the total useful life of the tool.

In connection with tools especially constructed for machining crankshafts, the respective gap will be so dimensioned that an axial relative displacement between tool and work piece becomes possible when the gap faces the work piece without requiring a radial tool displacement. This requirement is easily met by conventional angular position control means for the tool. Even in those instances where the work piece should also face with a particular position toward the tool, no problems are encountered because it is conventional to rotate the crankshaft in the machine tool into any desired angular position.

By using a circular central tool body in combination with tool carrier sections, an especially simple construction is achieved because the central tool body has a central rotational axis coinciding with the rotational axis of the tool and because the center of curvature for the individual tool carrier sections may be displaced away from the central axis of the tool carrier body. These structural features simplify the production of the tool because it avoids the difficult machining of a spiral shape out of one piece.

The present cutting edges or cutting plates may also be displaceable so as to compensate for wear and tear. Thus, the cutting plates may be inserted in an adjustable manner into cutting plate holders which permit a relatively small displacement of the cutting plates in at least one direction for compensating wear and tear.

BRIEF DESCRIPTION OF THE DRAWINGS

In order that the invention may be clearly understood, it will now be described, by way of example, with reference to the accompanying drawings, wherein.

Figures 1, 2, 3:
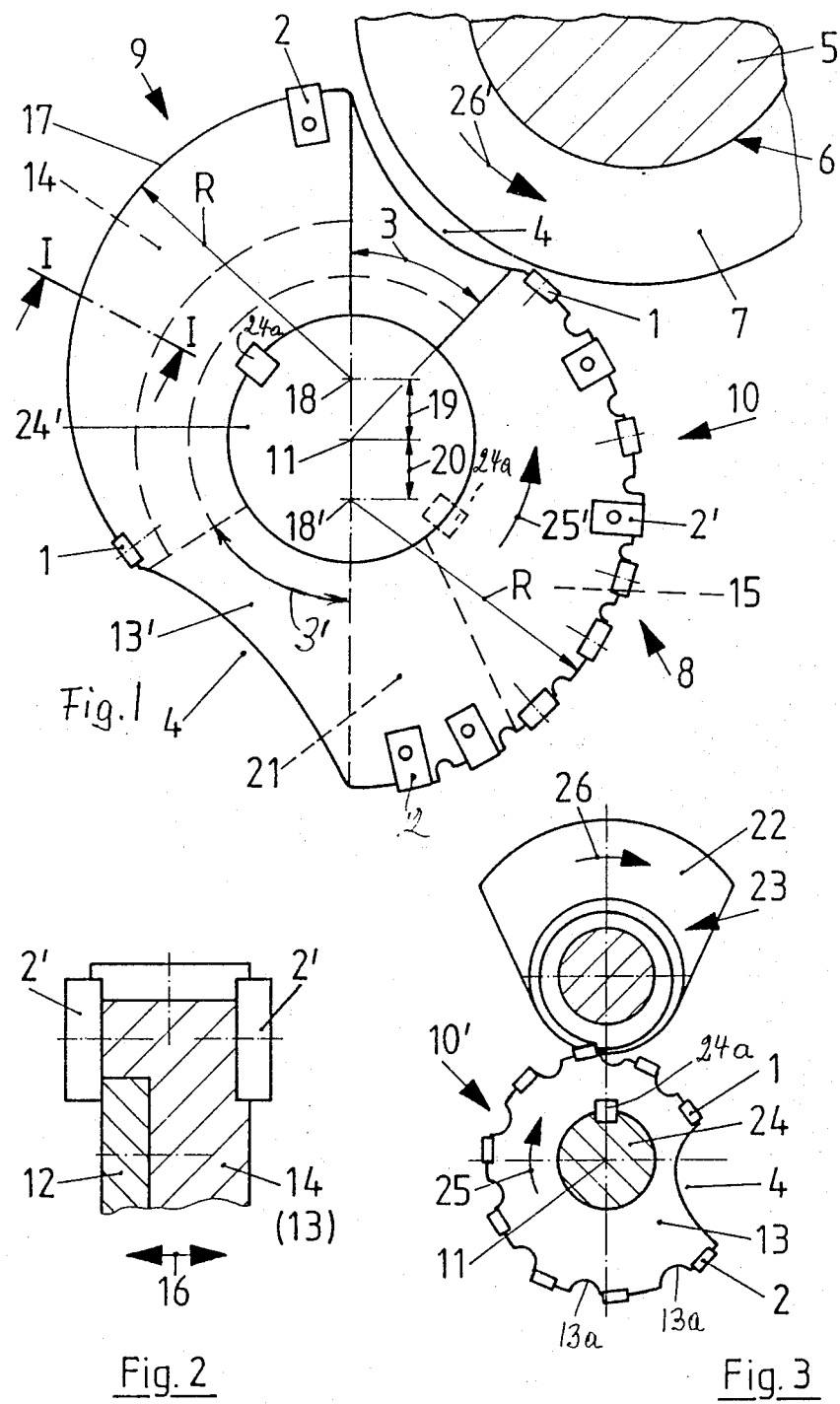
FIG. 1 is a side view of a tool according to the invention and of a view partially in section of a work piece, whereby the tool has two first sector type sections equipped with cutting edges and two sector type second sections forming the gaps free of cutting edges.
FIG. 2 is a sectional view along section line I—I in FIG. 1.
FIG. 3 is a side view similar to that of FIG. 1, however, showing a tool having but one group of cutting edges shown in a cutting position relative to a crankshaft work piece.

DETAILED DESCRIPTION OF PREFERRED EXAMPLE EMBODIMENTS AND OF THE BEST MODE OF THE INVENTION

Referring first to FIG. 3, a tool 10' according to the invention is shown in an operating position for broaching a pin 23 of a crankshaft 22. The tool 10' comprises a disk shaped base body 13 secured to a shaft 24 by a tongue and groove connection 24a for rotation about a rotational axis 11 as indicated by the arrow 25. The body 13 has a spiral circumferential contour and the cutting tool edges 1 and 2 are closely spaced around the circumference except in a gap 4 which, according to the invention, is free of cutting edges. Chip removal grooves 13a are provided in front of each cutting tool edge, except the first cutting tool edge 1 for which the gap 4 can act as a chip removal groove. The cutting tool edges are in the form of conventional cutting plates which are secured as is conventional for the intended purpose.

During the machining of the crankshaft 22 the tool 10' rotates slowly in the direction of the arrow 25. The radial position of the tool 10' relative to the crankshaft 22 is such that first the cutting plate 1 comes into the working position in which it engages the pin 23 of the crankshaft. As shown, the cutting edge 1 has already passed through the working range and the third cutting edge is presently engaging the crank pin 23. At the same time, the crankshaft 22 is rotated with a speed sufficient for producing the required cutting speed in the direction of the arrow 26. Thus, the cutting edges come sequentially into engagement with the crank pin and due to the spiral configuration, each successive cutting edge penetrates a little deeper into the work piece.

However, according to the invention the individual cutting edges are not distributed uniformly around the entire circumference of the tool 10, rather, the distribution of the cutting edges is such that a free space or gap or recess 4 is produced between the first cutting edge 1 and the last cutting edge 2. This gap is free of cutting edges and has an opening angle 3 as shown in FIG. 1. This opening angle 3 is smaller than 180°. As shown, especially in FIG. 3, the gap 4 may extend into the body 13 of the tool 10', for example, to provide a sufficient clearance for a relative axial displacement between the tool and the crankshaft when the gap 4 faces the crankshaft. As shown in FIGS. 1 and 3 the gap 4 has a convex shape reaching inwardly for providing said sufficient clearance.

As the machining operation proceeds, the last tool edge or plate 2 approaches the cutting range. When the last cutting edge 2 has passed through the cutting range, the crankshaft pin 23 will have the diameter indicated by the hatched portion of the pin 23. Due to the lateral cutting edges 2', as shown in FIG. 2, the lateral plane surfaces or so-called crank webs are also machined simultaneously with the pin. As soon as the last cutting edge 2 has passed through the cutting range, as the tool rotates in the direction of the arrow 25, the gap or recess 4 will face the crankshaft 22 so that now the finished work piece can be replaced by a work piece still to be machined without any danger that the machined surfaces will be marred. The work piece exchange is performed by conventional supply robots which need but a few seconds for an exchange so that the tool 10' can continue to rotate during such an exchange. Thus, directly after the exchange is completed, the first cutting edge 1 is now again ready to pass into the cutting zone. Hence, the free gap or recess 4 according to the invention makes it possible to exchange a work piece without a radial displacement of the tool 10' and without any danger of damaging the finished surfaces, nor of damaging the cutting edges. Additionally, if the gap 4 is properly dimensioned, the rotational movement of the tool 10' does not even have to be stopped for the work piece exchange. This feature substantially reduces any time intervals in which the machine tool is not cutting. The present gap 4 simplifies the construction of the machine tool in which the present tools are used. If desired, especially when smaller numbers of work pieces are to be machined, it is possible to stop the tool 10' when the gap 4 faces the work piece 22 in the proper angular position so that an axial displacement between tool and work piece may be made for machining another pin of the same crank shaft.

The embodiment of FIG. 3 shows a body 13 for the tool 10. The body 13 is a single piece member carrying the cutting edges 1, 2 all around its circumferential contour, except for the gap or recess 4. FIG. 1 illustrates a modification in which one or two tool carrier sections 14 and 15 may be equipped with cutting edges 1, 2. Only the first and the last cutting edge are shown on the tool carrier section 14 while the tool carrier section 15 is equipped with tool cutting edges along its entire circumferential length, including lateral tool cutting edges 2'. The tool base body 13' is secured to a shaft 24' by means of tongue and groove members 24a. The body 13 with its tool carriers 14 and 15 rotates about the central rotational axis 11 in the direction of the arrow 25'.

Referring further to FIG. 1, the tool body 13' supports the above mentioned two tool carriers 14 and 15 which are preferably separate elements attached to the body 13 as shown in FIG. 2. The tool carrier 15 carries a group 8 of tool cutting edges 1, 2. The carrier 14 carries a group of tool cutting edges 9. Each of the tool carriers 14, 15 has a radius R of curvature. However, these radii R have different origins. Thus, the curvature of the tool carrier 14 has its origin at 18 while the curvature of the tool carrier 15 has its origin at 18'. The origin 18 is spaced from the rotational axis 11 by a spacing 19. The origin 18' is spaced from the rotational axis 11 by a spacing 20. The two tool carrier sections or elements 14 and 15 are separated from each other by the two gaps 4 and 15 having each an opening angle of less than 180°. The opening angle 3, however, is somewhat smaller than the opening angle 3'. The gap 4 or rather, the sector forming the gap 4 has an outwardly facing boundary defined by a curved line, the curvature of which will depend on the configurations of work pieces for which the particular tool is intended.

The work piece 5 will be rotated in the direction of the arrow 26' with a speed sufficient for the machining operation while the tool 10 rotates counterclockwise in the direction of the arrow 25' at a slower speed.

The relative angular position shown in FIG. 1 permits a removal of the work piece 5 in a radial direction without any radial movement of the tool. The pin surface 6 and the crank webs 7 are completed. The work piece 5 may be a shaft or a crankshaft into which a groove has been machined, whereby the groove is defined by the surfaces 6 and 7. It is also possible in the position shown in FIG. 1, to move the tool axially relative to the work piece, for example, for machining another groove.

The type of cutting edges used in groups 8 and 9 may be same, or different types of cutting edges may be employed, depending on the type of machining operations intended to be performed by the tool.

The body 13 or 13' of the tool need not necessarily be a single piece disk. Rather, the tool body may be assembled from a plurality of elements which are secured to a flange 12 shown in FIG. 2. The flange in turn may be connected to a hub for attachment to the drive shaft 24 or 24'. By making the cutting edge carriers 14 and 15 exchangeable, or even exchangeable as several sections, it is easy to apply different types of cutting edges to a standardized central tool body so that tools for different purposes may easily be assembled from standardized components. These standardized components will satisfy the above mentioned requirements, for example, with regard to the radii R forming the circular circumferential contours 17 carrying the cutting edges. Although the gap or recess 4 is shown to have a certain shape in FIGS. 1 and 3, the gap may extend substantially deeper into the tool, for example, all the way down to the flange so that axial back and forth movement of the tool as indicated by the arrow 16 is possible even in connection with work pieces having dimensions requiring such deep gaps or recesses 4. By making the individual cutting edge carriers 14, 15 from sectors 21, it is even possible to assemble different types of cutting edges in a tool in a very easy and efficient manner because the sectors 21 can carry different types of cutting edges.

Although the invention has been described with reference to specific example embodiments, it will be appreciated, that it is intended to cover all modifications and equivalents within the scope of the appended claims.

What we claim is:

1. A turn broaching tool having a first rotational axis constructed for machining crankshafts having a second rotational axis arranged in parallel to said first axis, comprising at least one disk type tool body having an outer contour, said disk type tool body having at least one sector type first section, a plurality of cutting tool edges secured to said outer contour of said disk type tool body along said first section, and at least one sector type second section having an opening angle of less than 180°, said second section having a recess (4) in said disk type tool body along a circumferential surface free of any cutting tool edges for providing a spacing between said recessed circumferential surface and said crankshaft when said recessed circumferential surface is facing said crankshaft, whereby previously machined surfaces of said crankshaft can be kept free of cutting tool edges when said recessed circumferential surface is facing said crankshaft, wherein said recess (4) following a last cutting tool edge in said disk type tool body has a sufficient concave depth for shifting said turn broaching tool axially along said crankshaft without first shifting said turn broaching tool radially away from said crankshaft when said spacing is facing said crankshaft thereby avoiding any contact between said crankshaft and said second section of said tool, and wherein said disk type tool body comprises a base member rotatable about said first rotational axis (11) and at least one cutting tool edge carrier having said cutting tool edges secured thereto and forming said first section secured to said base member, said cutting tool edge carrier being so dimensioned that said section having an opening angle of less than 180° remains free of said cutting tool edge carrier to form said recess (4).

2. The turn broaching tool of claim 1, wherein said outer contour of said disk type tool body has a center of rotation located eccentric relative to said first rotational axis of said turn broaching tool.

3. The turn broaching tool of claim 1, wherein said plurality of cutting tool edges comprises a number of laterally effective cutting tool edges for machining plane surfaces of said crankshaft.

4. The turn broaching tool of claim 1, comprising at least two of said first sections and two of said second sections, each first section having an independent group of cutting tool edges secured to said first sections, each group comprising at least two cutting tool edges.

5. The turn broaching tool of claim 4 wherein one group of cutting tool edges is arranged for cutting one configuration on said crankshaft while another group of cutting tool edges is arranged for cutting another configuration on said crankshaft.

6. The turn broaching tool of claim 1, wherein said plurality of cutting tool edges comprises at least two types of cutting tool edges, and wherein at least one type includes several cutting tool edges.

7. The turn broaching tool of claim 6, wherein said cutting tool edge carrier has an opening angle, relative to said axis, of less than 180°.

8. The turn broaching tool of claim 6, wherein said cutting tool edge carrier comprises a number of sectors which together form said cutting tool edge carrier.

9. The turn broaching tool of claim 6, wherein said cutting tool edge carrier comprises a circumferential surface which is approximately part of a circular arc having a center of curvature which is displaced by a given distance (19, 20) from said first rotational axis.

10. A turn broaching tool having a first rotational axis constructed for machining crankshafts having a second rotational axis arranged in parallel to said first rotational axis, comprising at least one disk type tool body having an outer contour, said tool body further having at least two sector type first sections, and at least two sector type second sections, a plurality of cutting tool edges secured to said outer contour of said disk type tool body along said first sections, each of said at least two sector type second sections having an opening angle of less than 180°, each of said second sections further having a recess (4) in said disk type tool body free of any cutting tool edges for providing a spacing between said recessed circumferential surface and said crankshaft when said recessed circumferential surface is facing said crankshaft, whereby previously machined surfaces of said crankshaft can be kept free of cutting tool edges when said recessed circumferential surface is facing said crankshaft, and wherein each of said sector type first sections has a circular outer contour relative to a rotational center (18, 18') of the respective sector type first section, said rotational centers being displaced by a spacing (19, 20) from said first rotational axis so that said rotational centers and said first rotational axis pass through a common line.

11. The turn broaching tool of claim 10, wherein said plurality of cutting tool edges comprises a number of laterally effective cutting tool edges for machining plane surfaces of said crankshaft.

12. The turn broaching tool of claim 10, wherein said plurality of cutting tool edges comprises at least two types of cutting tool edges, and wherein at least one type includes several cutting tool edges.

13. The turn broaching tool of claim 10, wherein one of said first sections and one of said second sections together have an angle of 180°.

14. The turn broaching tool of claim 10, wherein said recess (4) following a last cutting tool edge in said disk type tool body has a sufficient concave depth for shifting said turn broaching tool axially along said crankshaft without first shifting said turn broaching tool radially away from said crankshaft when said spacing is facing said crankshaft thereby avoiding any contact between said crankshaft and said second section of said tool.

15. The turn broaching tool of claim 10, wherein each of said at least two first sections comprises an independent group of cutting tool edges secured to said first sections, each group of cutting tool edges comprising at least two cutting tool edges.

16. The turn broaching tool of claim 15, wherein one group of cutting tool edges is arranged for cutting one configuration on said crankshaft while another group of cutting tool edges is arranged for cutting another configuration on said crankshaft.

* * * * *

UNITED STATES PATENT AND TRADEMARK OFFICE
CERTIFICATE OF CORRECTION

PATENT NO. : 4,861,204
DATED : August 29, 1989
INVENTOR(S) : Garri Berstein, Hans W. Obrig, Helmut Wittkopp It is certified that error appears in the above-identified patent and that said Letters Patent is hereby corrected as shown below:

In the Claims:

Claim 1, (Col. 8, line 26), before "section" insert --second--.
Claim 5, (Col. 8, line 42), after "4" insert --,--.
Claim 7, (Col. 8, line 51), replace "6" by --1--.
Claim 8, (Col. 8, line 54), replace "6" by --1--.
Claim 9, (Col. 8, line 57), replace "6" by --1--.

Please replace claim 13 (Col. 10, lines 3, 4, and 5) to correctly read as follows:

-- 13

The turn broaching tool of claim 10, wherein said sector type first sections have a first opening angle, and wherein said sector type second sections have a second opening angle, said first and second opening angles being so dimensioned that a first opening angle and a second opening angle together have an angle of 180°.--

Signed and Sealed this

Tenth Day of July, 1990

*Attest:*

HARRY F. MANBECK, JR.

*Attesting Officer*     *Commissioner of Patents and Trademarks*